United States Patent [19]

Stickler et al.

[11] Patent Number: 4,659,479
[45] Date of Patent: Apr. 21, 1987

[54] ELECTROMAGNETIC WATER TREATING DEVICE

[76] Inventors: Raymond E. Stickler, 9909 W. Hawthorne, Mequon, Wis. 53092; Terry L. Eggerichs, 2604 W. Rogers, Milwaukee, Wis. 53215; Kenneth J. Larson, 320 Joanne Dr., Brookfield, Wis. 53005

[21] Appl. No.: 683,723

[22] Filed: Dec. 19, 1984

[51] Int. Cl.[4] .............................. C02F 1/48; B03C 1/00
[52] U.S. Cl. ................................... 210/695; 210/222; 210/232; 422/22
[58] Field of Search ............... 210/222, 223, 232, 695; 422/22

[56] References Cited

U.S. PATENT DOCUMENTS

| 438,579 | 10/1890 | Faunce | 210/222 |
|---|---|---|---|
| 1,949,660 | 3/1934 | Roberts | 210/223 |
| 2,583,522 | 1/1952 | Winslow et al. | 210/223 |
| 2,596,743 | 5/1952 | Vermeiren | 210/222 |
| 2,652,925 | 9/1953 | Vermeiren | 210/222 |
| 2,825,464 | 3/1958 | Mack | 210/222 |
| 2,939,830 | 6/1960 | Green et al. | 210/695 |
| 3,349,354 | 10/1967 | Miyata | 210/222 |
| 3,669,274 | 6/1972 | Happ et al. | 210/222 |
| 3,680,705 | 8/1972 | Happ et al. | 210/222 |
| 3,923,660 | 12/1975 | Kottmeier | 210/222 |
| 3,951,807 | 4/1976 | Sanderson | 210/222 |
| 4,082,665 | 4/1978 | Schneider et al. | 210/222 X |
| 4,151,090 | 4/1979 | Brigante | 210/222 |
| 4,157,963 | 6/1979 | Jessop | 210/222 |
| 4,167,480 | 9/1979 | Mach | 210/223 |
| 4,210,535 | 7/1980 | Risk | 210/222 |
| 4,216,092 | 8/1980 | Shalhoob et al. | 210/222 |
| 4,226,720 | 10/1980 | Brigante | 210/222 |
| 4,265,754 | 5/1981 | Menold | 210/695 |
| 4,265,755 | 5/1981 | Zimmerman | 210/222 |
| 4,278,599 | 7/1981 | Abrams et al. | 210/695 |
| 4,288,323 | 9/1981 | Brigante | 210/222 |
| 4,289,621 | 9/1981 | O'Meara, Jr. | 210/222 |
| 4,299,701 | 11/1981 | Garrett et al. | 210/222 |
| 4,347,133 | 8/1982 | Brigante | 210/222 |
| 4,407,719 | 10/1983 | VanGorp | 210/695 |
| 4,417,984 | 11/1983 | O'Meara, Jr. | 210/695 |
| 4,427,544 | 1/1984 | Rock | 210/222 |
| 4,428,837 | 1/1984 | Kronenberg | 210/222 |

FOREIGN PATENT DOCUMENTS 625732 7/1949 United Kingdom .
675369 7/1952 United Kingdom .

Primary Examiner—Richard V. Fisher
Assistant Examiner—W. Gary Jones
Attorney, Agent, or Firm—Fred Wiviott

[57] ABSTRACT

A device for treating aqueous solutions with magnetic lines of force includes a pipe through which the solution passes. An electromagnetic coil surrounds the pipe and a core consisting of endwise connected alternating short sections of magnetic and nonmagnetic material is disposed along the pipe's axis. Located between the pipe and the core is a helical baffle.

12 Claims, 4 Drawing Figures

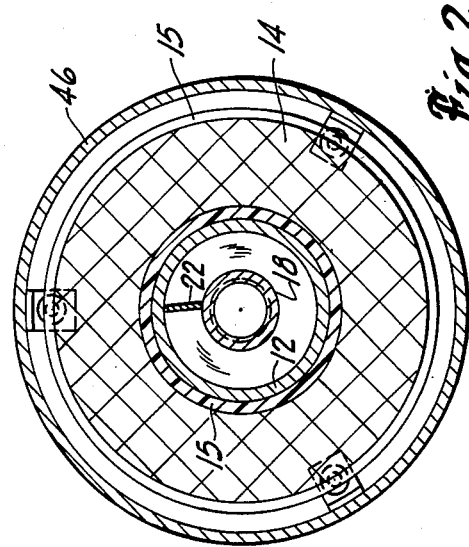
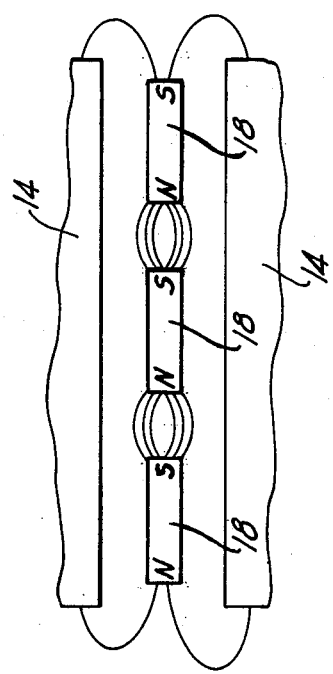
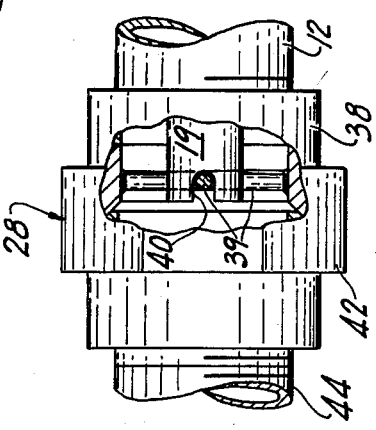
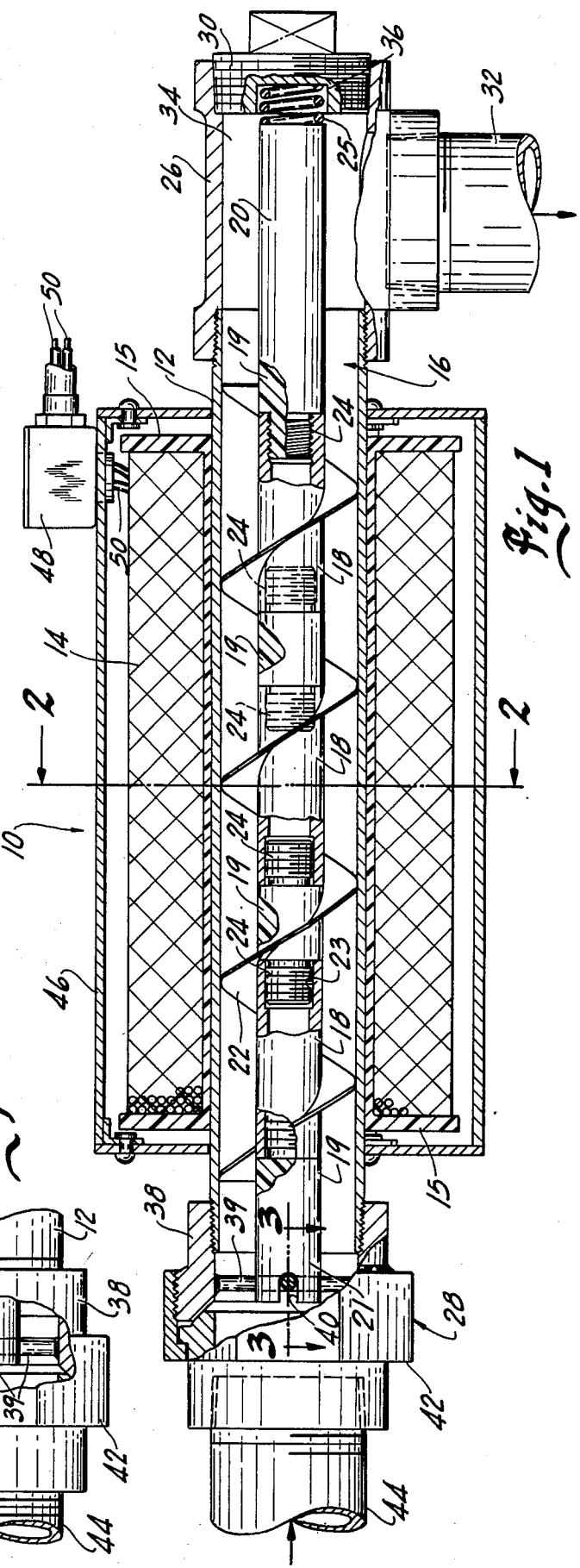

ELECTROMAGNETIC WATER TREATING DEVICE

BACKGROUND OF THE INVENTION

This invention relates to fluid treating devices and more particularly to an electromagnetic water treating device.

Electromagnetic water treating devices are well known in the prior art. Most such devices pass the fluid to be treated through a magnetic field which may be provided by electromagnetic coils or permanent magnets. One type of prior art device includes one or more permanent magnets disposed in surrounding relation to the fluid carrying conduit, as disclosed for example in U.S. Pat. Nos. 2,652,925; 3,349,354; 4,210,535; 4,157,963; 4,265,754; 4,265,755 and British Pat. No. 675,369. Another type of prior art device also employs permanent magnets, but these are disposed within the fluid stream as exemplified by U.S. Pat. Nos. 2,583,522; 2,825,464; 3,669,274; 3,680,705; 3,923,660; 3,951,807; 4,167,480; 4,216,092; 4,278,549; 4,289,621; 4,417,984; 4,428,837 and British Pat. No. 675,369. In yet another prior art type of magnetic water purifier, the magnetic field is generated by one or more electromagnets which surround the pipe, as exemplified by U.S. Pat. Nos. 438,579; 1,949,660; 2,596,743; 2,939,830; 4,407,709; and British Pat. Nos. 625,732 and 675,369. A variation of the electromagnetic field generating device includes an impeller disposed within the fluid carrying pipe and caused to rotate by the water flow as exemplified by U.S. Pat. Nos. 4,151,090; 4,226,720; 4,288,323; 4,347,133; and 4,427,544.

These prior art devices have generally been effective, in varying degrees, for inhibiting the formation of scale in such apparatus as boilers and heat exchangers. However, it is not believed that any of these prior art devices effectively eliminate odor and taste from water or inhibit the growth of

SUMMARY OF THE INVENTION

It is an object of the invention to provide a new and improved fluid treating device.

A further object of the invention is to provide a magnetic water treating device which prevents the formation of scale in aqueous solutions.

Another object of the invention is to provide a fluid treating device which contains no moving parts.

Yet another object of the invention is to provide a water treating device which inhibits the growth of algae, eliminates taste and odor and provides corrosion protection.

These and other objects and advantages of the invention will become more apparent from the detailed description thereof taken with the accompanying drawings.

In general terms, the invention comprises a device for treating aqueous or nonaqueous solutions with magnetic lines of force and including conduit means through which the solution flows, an electromagnetic coil surrounding the conduit in a concentric relation therewith, core means extending along the axis of the conduit and consisting of endwise connected alternating short sections of magnetic and nonmagnetic material, and a helical baffle disposed between the core and the conduit.

BRIEF DESCRIPTION OF THE DRAWINGS

FIG. 1 is a side elevational view with parts broken away of the water treating device in accordance with the preferred embodiment of the invention;

FIG. 2 is a view taken along lines 2—2 of FIG. 1;

FIG. 3 is a view taken along lines 3—3 of FIG. 1; and

FIG. 4 shows the distribution of the magnetic field of the device shown in FIG. 1.

DETAILED DESCRIPTION OF THE PREFERRED EMBODIMENT

The water purifying device in accordance with the preferred embodiment of the invention as shown in FIG. 1 to include a pipe 12 through which the solution being treated flows. An electromagnetic coil 14 is shown in concentric surrounding relation to pipe 12 and insulated therefrom by an electrically insulating spool 15. Extending along the axis of the pipe 12 is a core 16 formed of endwise connected alternating short cylindrical sections 18 and 19, respectively, of magnetic material, such as steel encapsulating iron powder, and nonmagnetic material, such as nylon. There are also nonmagnetic sections 20 and 21 at each end. Disposed between the core 16 and the pipe 12 is a helical baffle 22 which defines a helical flow path between the opposite ends of pipe 12. Both the pipe 12 and the baffle 22 are preferably of stainless steel and the baffle 22 is fixed in position in any suitable manner, such as by tack welding its opposite ends to the inner surface of the pipe 12. The inner edge of the baffle 22 is spaced from the core 16 so that the latter may be removed and replaced.

The metallic core members 18 preferably comprise a short tubular steel member which has internal threads 23 formed at each of its opposite ends. The nylon coupling sections 19 are also generally cylindrical members which have external threads 24 on each of their opposite ends for engaging the internal threads 23 of the metallic members 18. The end members 20 and 21 are of unequal length and each has external threads 24 formed at one end for engaging one of the members 18.

The opposite ends of the pipe 12 are threaded for receiving internally threaded coupling members 26 and 28. The coupling 26 is a T-joint having a tapered, threaded plug 30 at one end. Extending radially from the mid-section of coupling 26 is a water exit pipe 32. A compression spring 34 engages the end section 20 of core 16 and is received within a recess 36 formed in the plug 30 for urging the core 16 toward the left as viewed in FIG. 1.

The coupling 28 includes a first coupling member 38 which is threadably received on pipe 12 and has an X-shaped anchoring member 39 extending from one side to the other and positioned to be engaged by a complementary groove 40 formed in the end portion 21 of core 16. A second coupling member 42 secures one end of the water inlet pipe 44 to coupling 38.

It will be appreciated that the spring 34 retains the rod 16 in position against the member 39. Removal of the plug 30 will permit the core to be withdrawn and replaced.

A housing 46 is secured to pipe 12 and in surrounding relation to coil 14. In addition, a suitable terminal 48 is affixed to housing 46 for receiving conductors 50 which connect the coil 14 to a source of electrical energy.

In operation, the coil 14 is energized by an alternating or direct current. This magnetizes each of the metallic tubular sections 18 as shown in FIG. 4. Depending upon the direction of the current through the coil 14, corresponding ends of each of the metallic sections 18 will be polarized. As a result, magnetic lines of force B, as shown in FIG. 4, will extend generally radially from the opposite end of each metallic section 18. In the case of direct current, the magnetic field will achieve a steady state condition while in the case of alternating current, the magnetic field will also be alternating.

Along with the energization of coil 14, the liquid being treated will be delivered to the inlet pipe 44 and withdrawn through the exit pipe 33. The liquid flowing through the pipe 12 will follow the helical path defined by the baffle 22. As the water moves along this helical path, it will cross the magnetic lines of force emanating from each of the ends of the metallic members 18 and at an angle which approaches about 90°. In addition, because the helical path defined by baffle 22 increases the distance travelled by the liquid as it passes through pipe 12, end to end flow velocity within the pipe will thereby be increased.

The water purifying device 10 according to the invention is effective for preventing scale formation, eliminating taste and odor in water, and inhibits the formation of algae. Further, because the water is forced to traverse the magnetic field at plural points in its flow path, higher efficiencies are achieved. In addition because the electromagnetic coil is employed the field strength can be adjusted in accordance with conditions and the liquid being treated.

While only a single embodiment of the invention has been illustrated and described, it is not intended to be limited thereby but only by the scope of the appended claims.

We claim:

1. A method of treating an aqueous liquid for reducing scale formation, corrosion and the growth of algae, including the steps of:
   providing a core within and spaced from a conduit, said core having alternating sections of a ferrous magneticly permeable material and a nonferrous nonmagnetic material, energizing an electromagnetic coil surrounding said pipe for generating a magnetic field within said conduit such that said magneticly permeable sections are magnetized with adjacent ends having opposite polarities,
   passing the liquid to be treated through said conduit in a helical flow path defined by a baffle, said fluid moving around said core as it advances through said conduit and which moves transversely through the magnetic fields between adjacent ends of the magneticly permeable ferrous sections and in contact with the magneticly permeable ferrous material.

2. The method set forth in claim 1 wherein said coil is energized with alternating current.

3. The method set forth in claim 1 wherein said coil is energized with direct current.

4. A device for treating an aqueous liquid with magnetic lines of force, said device including:
   conduit means through which the liquid passes,
   an electromagnetic coil surrounding the conduit means,
   core means disposed within said conduit means and including alternating endwise spaced, axially aligned, tubular, magnetically permeable sections of a ferromagnetic material and non-magnetic coupling members disposed between the tubular sections for interconnecting the same, said core means being magnetizable by said electromagnetic coil so that said magnetically permeable form opposite polarity poles on adjacent ends, and
   baffle means disposed between said conduit and said core means for defining a convoluted flow path for the liquid as it flows between the opposite ends of said conduit means, the ferromagnetic material of the magnetic sections being exposed to the liquid flow path so that liquid flowing in said path is in contact with the ferrous material of said magnetically permeable sections.

5. The device set forth in claim 4 wherein said core means is removably mounted within said conduit means, and means for anchoring one end of said core means and resilient means engaging the core means for urging the same against said anchoring means.

6. The device set forth in claim 4 wherein said baffle means is generally helical.

7. The device set forth in claim 4 wherein said coil is connected to a source of alternating electrical energy.

8. The device set forth in claim 7 wherein said baffle means is generally helical.

9. The device set forth in claim 8 wherein said core means is removably mounted within said conduit means, and means for anchoring one end of said core means and resilient means engaging the core means for urging the same against said anchoring means.

10. The device set forth in claim 4 wherein said coil is connected to a source of direct current.

11. The device set forth in claim 10 wherein said baffle means is generally helical.

12. The device set forth in claim 11 wherein said core means is removably mounted within said conduit means, and means for anchoring one end of said core means and resilient means engaging the core means for urging the same against said anchoring means.

* * * * *